US006751209B1

(12) United States Patent
Hamiti et al.

(10) Patent No.: US 6,751,209 B1
(45) Date of Patent: Jun. 15, 2004

(54) HEADER COMPRESSION IN REAL TIME SERVICE

(75) Inventors: Shkumbin Hamiti, Espoo (FI); Janne Parantainen, Helsinki (FI)

(73) Assignee: Nokia Mobile Phones, Ltd., Espoo (FI)

( * ) Notice: Subject to any disclaimer, the term of this patent is extended or adjusted under 35 U.S.C. 154(b) by 0 days.

(21) Appl. No.: 09/505,643

(22) Filed: Feb. 16, 2000

(30) Foreign Application Priority Data

Feb. 17, 1999 (FI) .................................................. 990335

(51) Int. Cl.[7] .............................................. H24L 3/24
(52) U.S. Cl. ........................ 370/349; 370/392; 370/521; 375/240; 709/247
(58) Field of Search ........................ 370/395.6, 395.61, 370/395.62, 395.63, 396.64, 395.65, 389, 392, 393, 394, 521, 349; 375/240, 240.1, 240.2; 709/249, 247

(56) References Cited

U.S. PATENT DOCUMENTS

| | | | | |
|---|---|---|---|---|
| 5,293,379 | A | | 3/1994 | Carr .......................... 370/94.1 |
| 5,579,316 | A | | 11/1996 | Venters et al. ............. 370/94.1 |
| 5,835,730 | A | | 11/1998 | Grossman et al. ..... 395/200.77 |
| 6,366,961 | B1 | * | 4/2002 | Subbiah et al. ............. 709/238 |
| 6,385,199 | B2 | * | 5/2002 | Yoshimura et al. ......... 370/393 |
| 6,438,123 | B1 | * | 8/2002 | Chapman .................... 370/351 |
| 6,480,537 | B1 | * | 11/2002 | Agrawal et al. ............. 375/240 |
| 6,535,925 | B1 | * | 3/2003 | Svanbro et al. ............. 709/247 |

FOREIGN PATENT DOCUMENTS

| | | |
|---|---|---|
| EP | 0701354 A1 | 3/1996 |
| WO | WO 97/48212 | 12/1997 |
| WO | WO 99/04522 | 1/1999 |

OTHER PUBLICATIONS

"Low-loss TCP/IP Header Compression For Wireless Networks", Degermark et al., Wireless Networks 3, pp 375–387, 1997.

"GeRM: Generic RTP Multiplexing", M. Handley, Internet Engineering Task Force, pp. 1–7, 1998.

"Automatic Quality of Service in IP Networks", A. Chapman, Proceedings Of The Canadian Conference On Broadband Research, pp. 184–189, 1997.

"Compressing IP/UDP/RTP Headers For Low-Speed Serial Links", Casner et al., Internet Engineering Task Force, INTERNET-DRAFT.

"Low-Loss TCP/IP Header Compression For Wireless Networks", Degermark et al., Wireless Networks 3, 1997, pp. 375–387.

* cited by examiner

*Primary Examiner*—Alpus H. Hsu
*Assistant Examiner*—Thien Tran
(74) *Attorney, Agent, or Firm*—Perman & Green, LLP (57) ABSTRACT

A method for transferring a data packet from a compressor to a decompressor said data packet including a header with header data fields. A number of the header data fields that remain constant during the data transfer are stored in the decompressor. In a compressed data packet, a header data field that varies is replaced by a compressed value identifying a data packet in a compression sequence. In the decompressor context data comprising information for relating the received compressed value to a corresponding compression sequence is maintained and the information is updated according to the received compressed values. The compressed value and the information of the corresponding compression sequence are used for mapping the compressed value into a decompressed header data field. Thus compressed data is unambiguously mapped to a full packet data header field in the decompressor side throughout the session.

17 Claims, 8 Drawing Sheets

HEADER COMPRESSION IN REAL TIME SERVICE

FIELD OF THE INVENTION

The present invention relates to data transmission and especially to a method for transferring a data packet from a compressor to a decompressor, said data packet including a header with header data fields, a number of the header data fields that remain constant during the data transfer being stored in the decompressor. The method comprises sending from the compressor and receiving at the decompressor a data packet comprising information on one or more header data fields that vary during the data transfer; and decompressing the header using the stored header data fields and the received information on the one or more header data fields that vary during the data transfer. The invention also relates to access network elements implementing the invented method.

BACKGROUND OF THE INVENTION

Real time services constitute an emerging set of technologies that enable voice, data and video collaboration over packet switched networks. Along the standardisation of packet switched radio systems interest in providing real time services also through wireless networks has risen. In real time services packet transmission is carried out using a number of protocols. This introduces a large protocol overhead and causes inefficient bandwidth usage. As the transmission rates in wireless systems are limited, transferring of large headers mean wasteful use of capacity.

To overcome the problem of large headers, a variety of header compression schemes have been introduced. Publication "Compressing IP/UDP/RTP Headers for Low-Speed Serial Links" by S. Casner and V. Jacobson, Internet Engineering Task Force, INTERNET-DRAFT, draft-ietf-avt-crtp-05.txt, July 1998 presents effective header compression algorithms that enable header size reduction by a magnitude. The presented header compression is based on the fact that some of the bytes in the IP, UDP and RTP headers remain constant over the life of the connection. After sending an uncompressed header these fields may be elided from the compressed headers that follow. Furthermore, differential coding is used on the changing fields to reduce their size. In RTP header the difference from packet to packet is often constant and therefore also the second order difference is zero. By maintaining both the uncompressed header and the first order differences in the session state shared between the compressor and decompressor, it is mainly necessary to indicate that the second order difference between successive packets is zero. It is also suggested that a compressor implementation might maintain state for multiple session contexts. Using a hash function on certain predefined fields to index a table of stored session contexts, and including a session context identifier in compressed packets would enable the decompressor to index a table of stored session contexts directly.

Real time services cause strict limits for transmission delays and therefore normal retransmission procedures (e.g. in Transport Control Protocol, TCP generally used for transmission of IP packets) are generally not applicable. Thus, a link in real time services in practice will be considered a simplex link. In the prior art reference, for simplex links a periodic refresh scheme is suggested. Whenever the decompressor detects an error in a packet stream, it discards all packets in that stream, and will not resume decompression until a regularly transmitted uncompressed header (refresh header) is received. This means that after a transmission error all packets until the next refresh packet are lost. In transmission links where errors occur relatively seldom this does not have much effect on the transmission throughput. Anyhow, when a link with high risk of multiple transmission errors is involved, the effect is disruptive. This is especially the case with wireless transmissions.

A publication "Low-loss TCP/IP header compression for wireless networks"n by Mikael Degermark, Mathias Engan, Björn Nordgren and Stephen Pink, Wireless Networks 3 (1997) 375–387, J. C. Balzer A G, Science Publishers presents header compression schemes for UDP/IP and TCP/IP protocol where the problem of simplex links and lossy links have been dealt with. In the presented system the compressor sends a full header and a compression identifier, which is a small unique number also carried by compressed headers. The full header is stored as a compression state by the decompressor. The compression identifiers in compressed headers are used to lookup the appropriate compression state to use for decompression. To avoid incorrect decompression due to inconsistent compression state some further mechanisms are introduced. Each version of the compression state is associated with a generation, represented by a number, carried by full headers that install or refresh that compression state and in headers that were compressed using it. Thus the decompressor is able to detect when its compression state is out of date by comparing its generation to the generation in compressed headers. Furthermore, to avoid long periods of packet discard when full headers are lost and on the other hand to get as high compression rates as possible, the compressor starts with a short interval between full headers, and the refresh interval is exponentially increased with each refresh until a steady state refresh period is reached (compression slow-start). A modest trade-off of some header compression is also suggested.

Though the use of compression state generation facilitates easier detection of inconsistent compression states, the packets will anyhow be lost until a full header installs a proper compression state. Compression slow-start helps finding a convenient trade-off between the compression rate and acceptable recovery time, but in difficult transmission conditions, the compression rate will anyhow be compromised and the advantage of header compression will be diminish.

SUMMARY OF THE INVENTION

Now a method and network elements implementing the method have been invented, with the help of which these problems can be avoided or their effect can be reduced.

According to a first aspect of the present invention there is provided a method for transferring a data packet from a compressor to a decompressor said data packet including a header with header data fields, a number of the header data fields that remain constant during the data transfer being stored in the decompressor. The method comprises sending from the compressor and receiving at the decompressor a data packet comprising information on one or more header data fields that vary during the data transfer; decompressing the header using the stored header data fields and the received information on the one or more header data fields that vary during the data transfer. The method is characterised by sending from the compressor and receiving at the decompressor a compressed value for a header data field, said compressed value identifying the data packet in a compression sequence; maintaining in the decompressor context data comprising information for relating the received compressed value to a corresponding compression sequence, the information being updated according to the received compressed values; and using the compressed value and the information of the corresponding compression sequence for mapping the compressed value into a decompressed header data field.

The advantage of the invention is based on the fact that most of the fields in the network layer packet remain constant throughout a session. Network layer in this context refers to packet data network level protocol layers, referring to e.g. IP, UDP and RTP protocols. Furthermore, it is appreciated that changes in the fields that vary from packet to packet are predictable. Such fields are sent in a compressed form to the decompressor. Based on the prior knowledge of the anticipated changes, the decompressor will generate and maintain context data that is updated with the information from the packets that are received in the decompressor. Compressed data maps unambiguously to a change in a decompressed value in a set of consecutive data packets, a compression sequence. In the context data, information on one or more compression sequences is maintained. This information provides means for associating the received compressed data with a correct compression sequence. Using the received compressed data with the corresponding context data maintained in the decompressor enables the compressed data to be unambiguously mapped to a full packet data header field in the decompressor side throughout the session. Preferably, data packets carrying information that can not be correctly associated with any of the compression sequences of the context data maintained in the decompressor are filtered out already in the compressor side. Compared to the earlier solutions, the compression in the invented method is increased since also the varying fields that are related to identification of packets can be compressed. Still, transmission errors will have effect only on transmission of individual packets and problems in transmission of one packet do not escalate to subsequent packets. The scheme of refreshing complete header information can be designed to occur at longer intervals, or it can be abandoned altogether. Further aspects of the invention are presented in the independent claims 9, 13 and 15. Preferred embodiments are presented in the dependent claims.

BRIEF DESCRIPTION OF THE DRAWINGS

For a better understanding of the present invention and in order to show how the same may be carried into effect reference will now be made, by way of example, to the accompanying drawings, in which.

DETAILED DESCRIPTION OF THE DRAWINGS

The invention will be illustrated with an embodiment where an ITU-T voice encoder G.723.1, Internet Protocol version 4 and General Packet Radio System (GPRS) of ETSI are in use, each of these generally known to a person skilled in the art. It should be noted that for all these systems parallel or corresponding technologies exist and will further evolve. Consequently, the scope of protection is not limited by the details of the protocols used in the following description. The method presented herein is applicable also in fixed networks, but the problem being more obtrusive in wireless communication, such a structure is used in this example.

Figure 1:
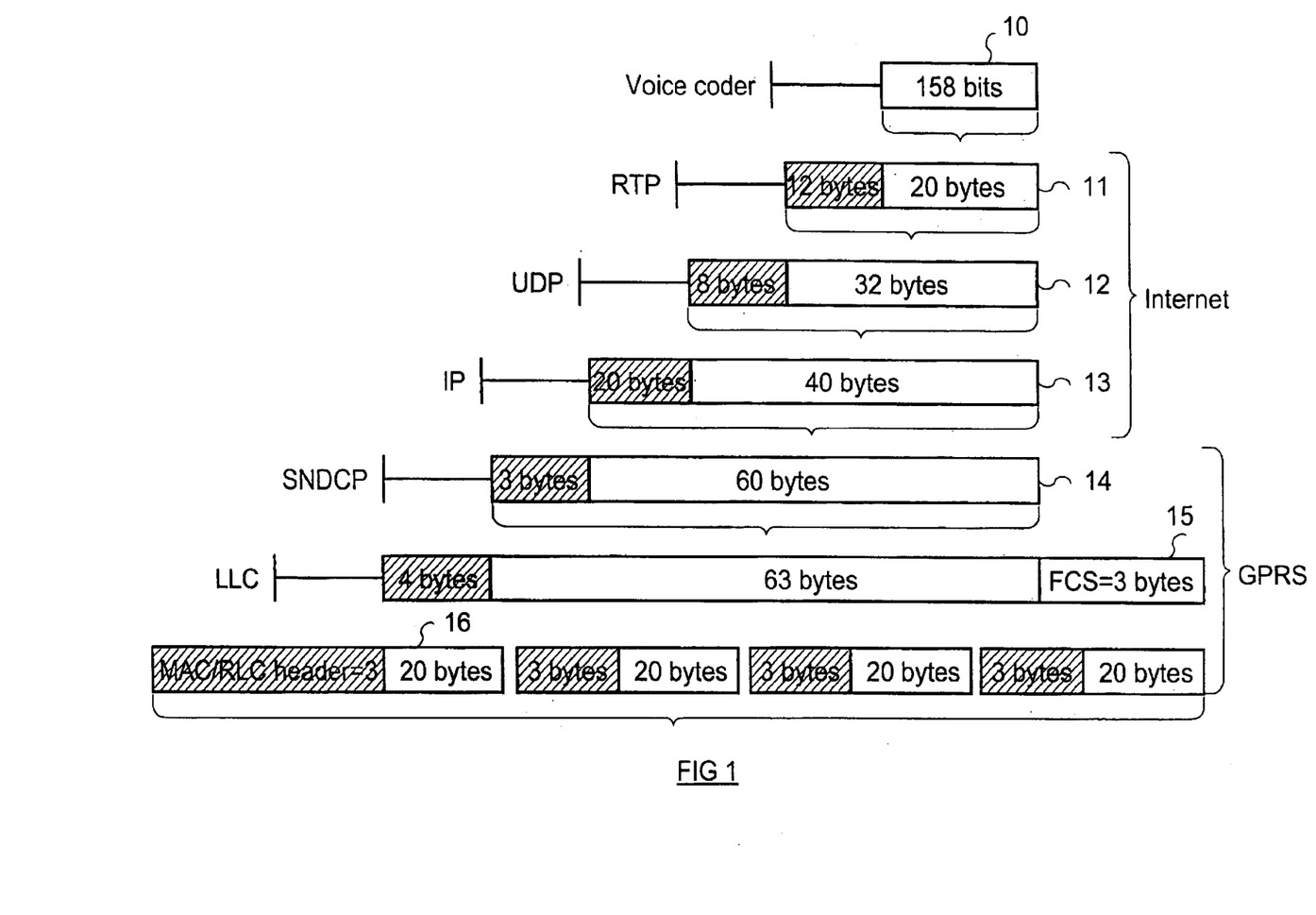
FIG. 1 presents the accumulation of header overhead by the different layers in transmission of one voice frame 10 over a wireless IP connection.

FIG. 1 presents the accumulation of header overhead by the different layers in transmission of one voice frame 10 over a wireless IP connection. The shaded blocks represent headers and white blocks represent payload in a data frame. First the speech frame 10 is encapsulated into a Real Time Protocol (RTP) packet 11, which is put into a User Data Protocol (UDP) packet 12 and further to an Internet Protocol (IP) packet 13. The IP Packet 13 is further encapsulated using Sub-Network Dependent Convergence Protocol (SNDCP) 14 and Logical Link Control protocol (LLC) into an LLC block 15, which is divided into an appropriate number of RLC blocks each containing a separate header. As can be seen, the cumulative overhead is very large. Already in IP layer the protocol overhead is 40 bytes and the bandwidth utilization around 33% when a G723.1 encoder is used. Since still more overhead is generated by the protocol headers of the wireless link, the situation gets even worse.

Figure 2:
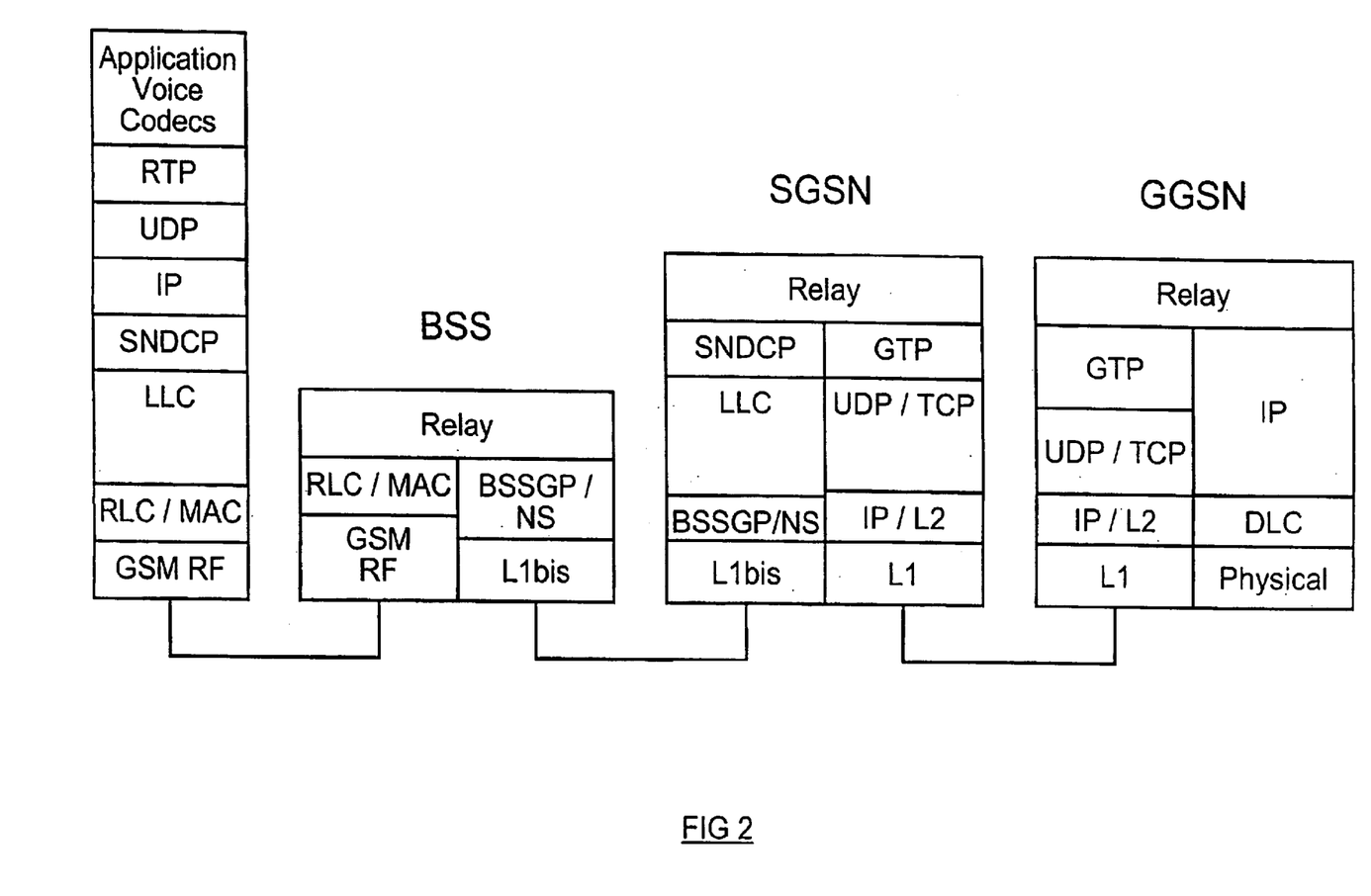
FIG. 2 illustrates some of the functional elements and the related protocol structures of a GPRS network.

In this embodiment, header compression and header decompression are carried out in the protocol layer specific to the access network, in this case the SNDCP layer. FIG. 2 illustrates some of the functional elements and the related protocol structures of a GPRS network. GPRS is implemented logically to general GSM-struture by two network elements, a Gateway GPRS Support Node (GGSN) and a Serving GPRS Support Node (SGSN). GGSN is the first Packet Data Network access point in a GSM network supporting GPRS. Data packets whose PDP Address (Packet Data Protocol, e.g. IP or X.25) indicate a GPRS-subscriber are routed to the GGSN. GGSN provides information needed to route the data packets to the subscriber's current access node SGSN. GGSN may query subscriber's location data from a GSM Home Location Register (HLR). SGSN is an access node serving the Mobile Station (MS). For GPRS connection, SGSN establishes mobility management functionality towards the MS and PDP functionality towards the packet data network to route the data packets towards GGSN. SGSN and GGSN can be integrated into a same physical node, or they may be located in separate nodes.

The access network SNDC function provides to the network layer a service for transferring a minimum amount of data between the SGSN and MS through different compression techniques. GPRS provides a procedure, which is implemented in connection with the service negotiation, for the MS and the SGSN to agree on the compression algorithm to be used in the session. In the invented method, parts of the header that are supposed to remain constant are stored in the SNDCP entities. Next the structure and contents of a network layer protocol header is studied in more detail.

Figure 3:
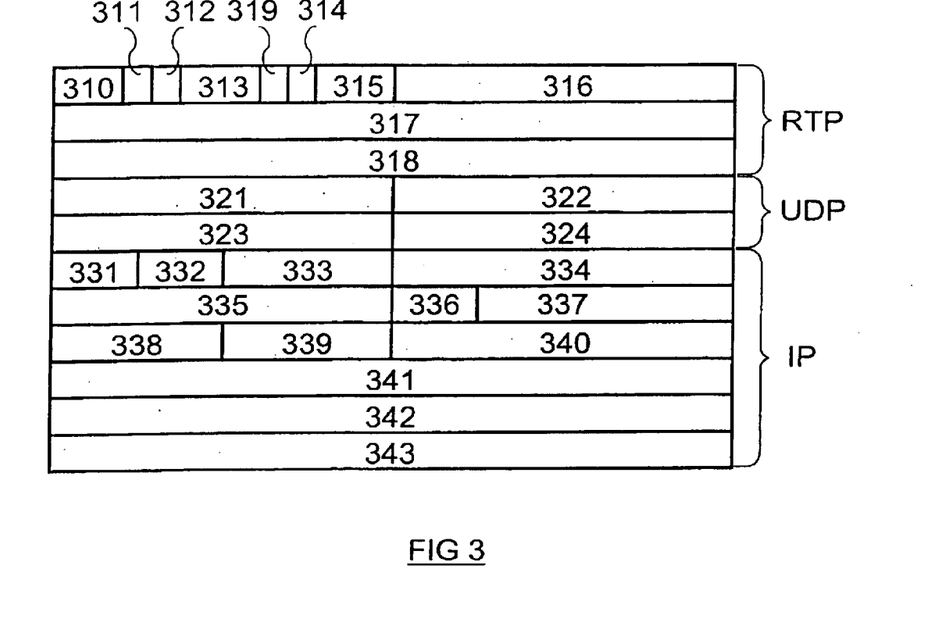
FIG. 3 illustrates fields of the network layer RTP, UDP and IP headers.

In FIG. 3, fields of the network layer RTP, UDP and IP headers are shown. Considering the RTP, field 310 indicates the RTP version in use and does not change during the session. Field 311 includes the padding bit and does not change unless additional padding is included in the end of the header, for example for encryption algorithm purposes on application layer. Field 312 indicates whether a fixed header is followed by header extension, and will not change during the session. Field 313 corresponds to CSRC count that is needed for multiplexing purposes e.g. to indicate how many users have contributed to the payload. In many cases this value will remain constant throughout the session. Field 315 indicates the payload type and is constant for one type of data. Generally, the contributing source and synchronisation source are constant throughout the transmission over the air interface, and therefore the field 318 will remain constant.

Field 314 includes a marker bit that is optionally used to mark important events in the packet stream, for instance, the beginning of a speech burst, or a last packet in a video frame. If the marker bit 314 is used it needs to be transmitted in the compressed header. Field 316 indicating the sequence number and field 317 indicating the time stamp will change for all RTP Packets.

Considering the UDP, field 321 indicating the source port number and field 322 indicating a destination port number are used to separate different data streams associated to the same application. For instance, data and control information of RTP layer can be directed to different ports, i.e. different payload types can use different UDP port pairs. These fields will remain constant as long as same type of data is being transmitted. Field 323 indicating the UDP packet length remains constant as long as the length of the RTP packet inside it will remain constant. In cases where the UDP length is variable throughout the session (e.g. transmission of video) the length of the packet must be transmitted in the compressed header. Field 324 corresponds to the UDP checksum and is used to detect the errors in the transmission. This field does not have to be transmitted over the transmission link that has a strong error protection mechanism or means to detect transmission errors (e.g. lower protocol layer checksums). In this embodiment the SNDCP decompression function can e.g. calculate the checksum from the decompressed fields and use the calculated checksum in the decompressed packet.

Considering IP, field 331 indicating IP version, field 332 indicating the header length, field 333 indicating the type of service, field 334 indicating total length of the packetare assumed to remain constant at least as long as speech frames encoded at constant bit-rate are transmitted. Field 336 indicating the flags can be assumed to remain constant as long as the fragmentation s not used. Field 337 including the 13-bit fragment offset is assumed to remain constant as well as field 339 indicating the protocol. Fields 338 indicating the time to live and 340 indicating the checksum can be defined by the SNDCP function. During data transmission IP source and destination will remain constant and thus fields 341 and 342 indicating the source IP address and destination IP address respectively are assumed to remain constant. The identification field 335 is mainly used for IP packet fragmentation. If fragmentation is not used, it is not necessary to send this field. If fragmentation is used, SNDCP should first rebuild the packet before compressing it.

The fields that are assumed to remain constant most of the time are grouped to a set of no-change fields. In this embodiment and in connection with speech frames from a constant bit-rate encoder, the set will comprise following fields: 310, 311, 312, 313, 315, 318, 321, 322, 331, 332, ,33, 334, 335, 336, 337, 338, 339, 341, 342, 343. These fields will constitute a state of compression that will be maintained at least in the receiving (decompression) end of the link.

As mentioned earlier, further to the no-change fields, a second set of fields whose contents can be deduced from the received information can be elided in the compressed header. Such fields do riot have any effect on the state of compression either. Such fields in the presented embodiments are fields 324 and 340 comprising the checksums used for checking the validity of the packets. These sums can be calculated in the decompressor from the decompressed data fields. The validity of the packets can be ascertained using the checksums of the lower level, e.g. access network level data units.

Figure 4:
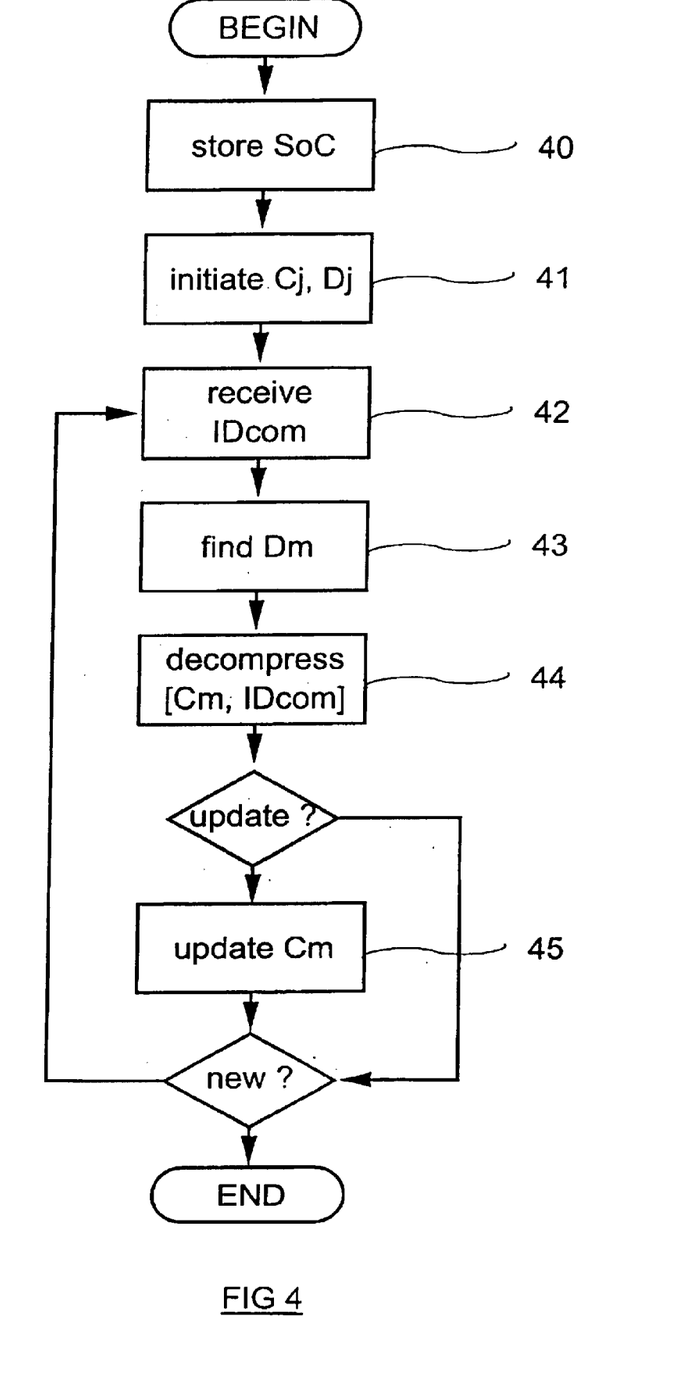
FIG. 4 illustrates functions in the receiving entity according to the invention.

The solution according to the invention for managing the fields that change for each packet is illustrated in a general form in FIG. 4, where functions in the receiving entity, in this embodiment the SGSN (also: decompressor) are shown. In connection with the session set-up information needed for the state of compression is received in the decompressor (e.g. a full header). In order to ensure that a correct state of compression is used, an acknowledgement procedure can be included in the session set-up signalling. In step 40 the state of compression SoC is stored in the decompressor. In step 41 a session context comprising one or more context values Cj, each relating to a certain compression sequence, are initiated in the decompressor. A packet is received from the transmitting entity, in this case the MS (also:compressor) (step 42). The packet comprises a compressed data field Dcom. In case more than one context values are maintained (maximum value for j>1), a set of decision rules Dm for relating a received Dcom with a corresponding context value Cj is defined. A decision rule Dm matching with the received Dcom is determined (step 43), and the decompressed value Dfull is derived (step 44) from the value of the received IDcom and the context value Cm of the determined Dm. According to the anticipated evolution of the fields, none, one or more context values Cm are updated (step 45) to maintain the context data. This procedure will be followed for new packets throughout the data transfer session.

The changing fields to be transmitted in this embodiment are field 316 indicating the RTP sequence number, field 317 indicating the RTP timestamp and field 335 indicating the IP identification. Appreciating the fact that the increments in these fields generally remain constant throughout the session, a prior art delta-coding (with reference to a previously transmitted packet) scheme could be suggested. Anyhow, to avoid the problems presented earlier, an independent identification is provided for each network layer packet subject to the compression.

In the first embodiment, header fields are compressed into abbreviated fields and transmitted over the link. The length of an abbreviated field is chosen to provide transmission of information that facilitates a correct identification of the packet during a compression sequence, an interval that is generally shorter than the session. Short-term identification, provided by the abbreviated fields, combined to a longer-term context maintained in the decompressor provides a consistent identification of packets throughout the data transfer session, and thus enables unambiguous mapping of compressed header fields to full header fields throughout a whole data transfer session.

Figure 5:
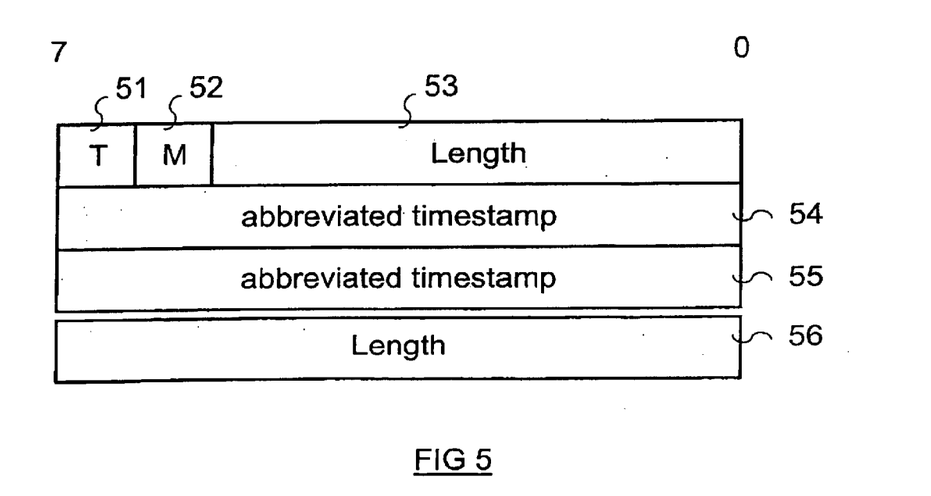
FIG. 5 represents a format for a compressed header used in an embodiment of the invention.

As an example of such an arrangement, a case of an abbreviated time-stamp is presented. FIG. 5 represents a format for a compressed header used in this embodiment.

Field 51 indicates the type T of the compressed packet. If T=0, the last octet 56 is not included and the last six bits 53 of the first octet are set to zero, used for some other purpose, e.g. for CRC check, or used for an abbreviated time-stamp. If T=1 the compressed header shall include the length octet and the bits 53 and the last octet 56 are used to indicate the length of the RTP payload. This length information is needed with bit streams where the packet length may vary, e.g. video bit-streams. Field 52 indicates the marker bit of the RTP header as explained earlier. The abbreviated time-stamp in this embodiment is a 16-bit field that indicates the 16 least significant bits of the RTP time-stamp. The context data comprises the 16 most significant bits of the RTP time-stamp and will be maintained at least in the decompressor end of the link.

Figure 6:
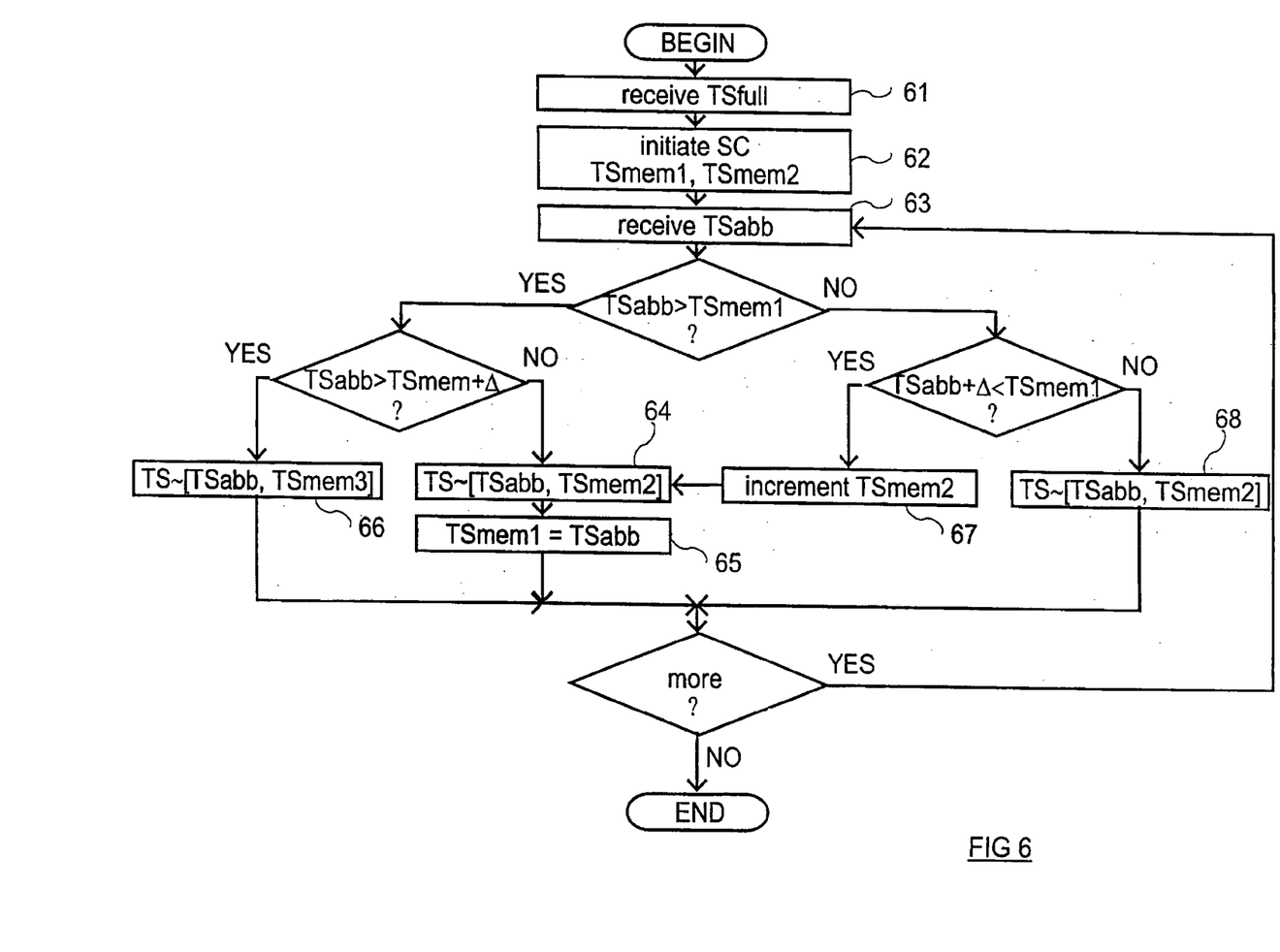
FIG. 6 illustrates steps of the embodiment of the invented method where the abbreviated time-stamp is used.

The flow chart of FIG. 6 illustrates the steps of the embodiment of the invented method where the abbreviated time-stamp is used. In step 61 the state of compression is received, as in this case in a full timestamp TSfull received in the beginning of a session. In the beginning of the session the context data is initialised, in this case TSmem1 comprising the 16 least significant bits of the original time-stamp and TSmem2 comprising the 16 most significant bits of the original time-stamp (step 62). In step 63 a new abbreviated time-starnp TSabb carrying 16 least significant bits of the time-stamp of a new compressed network layer data packet is received. The new abbreviated time-stamp is compared with the stored value TSmem1 in the decompressor. As will be seen later, the value of TSmem1 will comprise the 16 least significant bits of the largest time-stamp received so far.

If the new abbreviated time-stamp TSabb is greater than the stored value TSmem1, it is further checked whether the new abbreviated time-stamp TSabb is greater than the sum of the stored value TSmem1 and a pre-defined value $\Delta$. The value $\Delta$ represents a maximum change in the least significant bits that can be interpreted to be caused by some anticipated phenomena such as silence, lost packets or packets arriving in slightly wrong order. When the number represented by the 16 least significant bits of the time-stamp has reached the maximum, it will reset and start again from the smallest value (compression sequence). When a packet comes late to the compressor, it is possible, that the stored value TSmem1 has already wrapped around and thus the value of the received abbreviated time-stamp TSabb is considerably larger than TSmem1. By defining an appropriate value for $\Delta$, such cases can be detected in the stream of received packets. If the received abbreviated time-stamp TSabb is greater than TSmem1 but the difference is not too big (smaller than $\Delta$), the time-stamp can be reconstructed by using the 16 most significant bits stored in the value TSmem2 and combining this to the 16 least significant bits received from the compressor (step 64). The received abbreviated time-stamp TSabb is the largest abbreviated time-stamp received so far, and it is thus stored as TSmem1. If the received abbreviated time-stamp TSabb is greater than TSmem1 and the difference is bigger than $\Delta$, it is assumed that Tsabb arrived late and Tsmem1 has already wrapped around. For these cases, a further context data value TSmem3 relating to the previous compression sequence is maintained in the context data. TSmem3 comprises the previously stored value of TSmem2. The reconstruction of the time-stamp is now done by using the 16 most significant bits stored in the value TSmem3 and combining this to the 16 least significant bits received from the compressor. No updates to the values of TSmem1, TSmem2, TSmem3 are made.

If the value of the received abbreviated time-stamp TSabb is smaller than TSmem1 it is checked whether the difference is greater than $\Delta$. This being the case, the abbreviated time-stamp comprising the 16 least significant bits of the time-stamp has reached the maximum, wrapped around and the stored value TSmem2 has to be incremented to the next possible value (step 67). After this the time-stamp can be reconstructed and the stored value TSmem1 can be updated as explained with steps 64 and 65. For instance, consider a case where the stored time-stamp values are TSmem1=FF FF (hex), TSmem2=02 FF (hex), $\Delta$=0FFF (hex) and the received abbreviated time-stamp value is TSabb=00 0A (hex). Now the abbreviated time-stamp value 00 0A is smaller stored time-stamp value FF FF, the difference is greater than $\Delta$ and therefore the 16 most significant bits 02 FF of TSmem2 must be updated by one to a value 03 00. The resulting timestamp value will thus be 03 00 00 0A. If the difference is smaller than $\Delta$, it means that the packet belongs to the current sequence, but it arrives delayed. In such a case the time-stamp can be reconstructed by using the 16 most significant bits stored in the value TSmem2 and combining this to the abbreviated time-stamp TSabb received from the compressor. Since this is not the largest abbreviated time-stamp received so far, the value TSmem1 is not updated. As long as more new packets arrive this procedure will be followed. This same idea is applicable for other fields as well. For example let us examine a complete sequence number of the RTP header. If the original sequence numbers are (in binary form) 00010000, 00010001, 00010010, the abbreviated sequence numbers that are transmitted to the decompressor are 0000, 0001, 0010. In the decompressor context data comprising at least the current most significant bits is maintained. With similar type of decision rules the compressed data can be associated with the compression sequence(s) in the decompressor and mapped to a full header field.

Other type of relation between the compressed data and increments used in the decompressor is possible, as well. For example, when it is known that the time stamp can change by 240 for each packet, an increment of one in the compressor can be mapped to an increment of 240 in the decompressor. Therein (compression value →decompressed time-stamp): 0001 →>240 0010→480 0011→720 0100→960, etc.

As shown, the context data is updated according to the information in the received abbreviated fields. The degree of abbreviation i.e. the amount of bits used for representing the abbreviated field have an effect on the rate at which the context information in the decompressor is updated. For example, the shorter the compression sequence is the more often the time-stamp value TSmem2 storing the most significant bits of the time-stamp has to be updated. Even if some packets may be lost or their order may slightly change, comparisons for validity shown earlier take care that the data can be regenerated correctly. In wireless connections, losing a long sequence of packets generally leads to a dropping of the ongoing call. Thus as long as the connection can be maintained, it is also possible to maintain a consistent context information in the decompressor with a reasonable amount of degree of compression. For example, with 6 bits it is possible to distinguish 64 packets. Losing of 64 successive packets and still maintaining the connection is improbable and therefore the invented method will perform well as long as the connection can be maintained.

Figure 7:
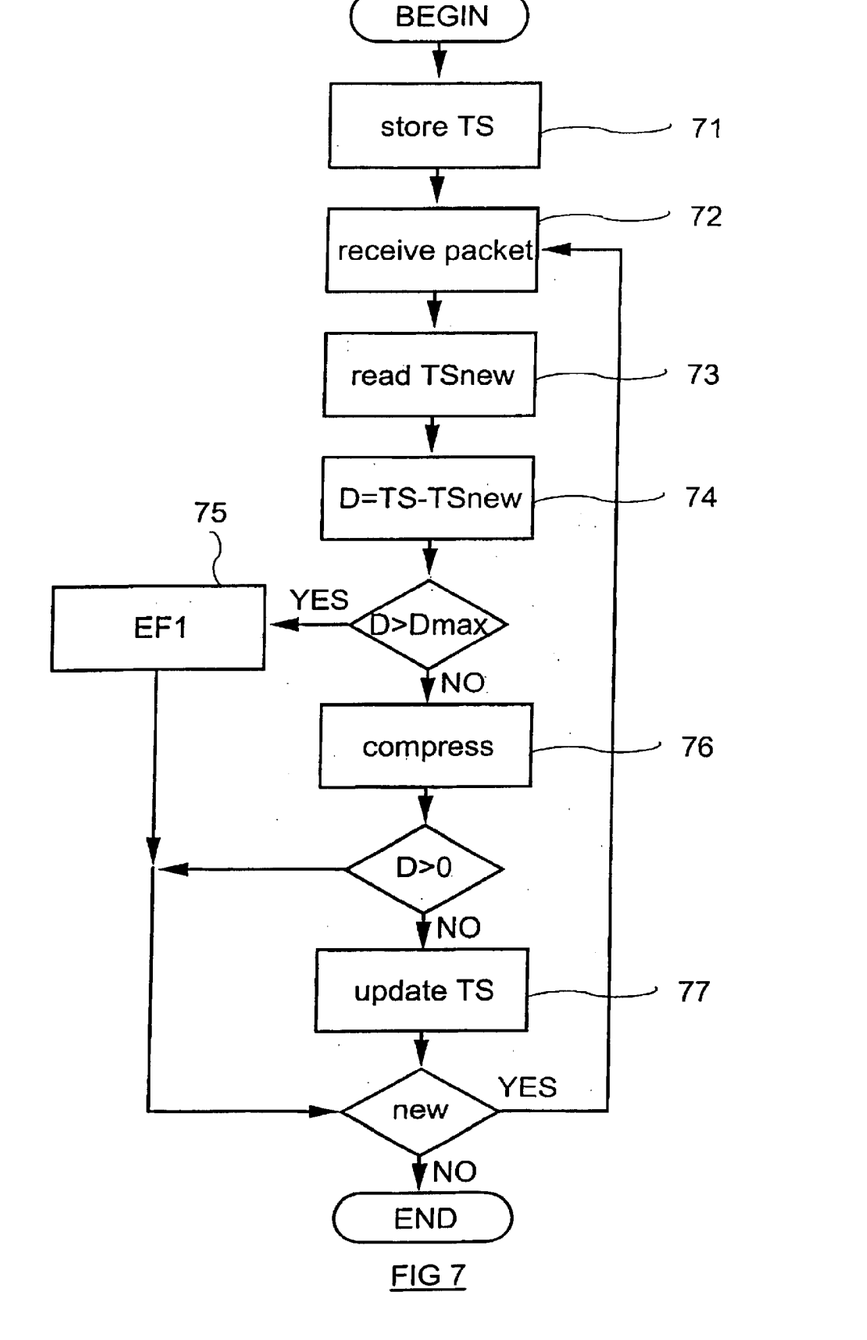
FIG. 7 presents an example of a filtering algorithm according to the invention.

For packets that might disturb the compression, e.g. ones that arrive very late to the compressor and might therefore potentially disrupt the order of updating the compression information, a further functionality in the compressor is preferably provided. Receiving a delayed packet where the field to be abbreviated is detected to pose a risk of causing an error in the compression information will result in a corrective action already in the compressor side. For example such packets may be discarded altogether. For instance packets arriving late but belonging to the precedent compression sequence can be recovered the use of context value TSmem3, as explained in connection with FIG. 6. A packet belonging to a compression sequence preceding the precedent compression sequence would not be regenerated correctly anymore and therefore such packets are preferentially managed already in the compressor. The flow chart of FIG. 7 presents an example of such a filtering algorithm that can be added to the invented method in the compressor side for managing situations with much delayed packets.

In step 71 the whole time-stamp of the first received packet is stored. When a new packet is received (step 72) its time-stamp TSnew is read (step 73) and the difference D between the stored time-stamp TS and the new time-stamp TSnew is calculated (step 74). If the difference D is greater than a certain pre-defined value Dmax, the compressor will deem the packet too much delayed and initiate a corrective action (step 75). Such an action is, for example sending whole fields instead of abbreviated fields, and including an indication to the decompressor not to update of the context data. Such an action is also be simply discarding such delayed packets. This would be a natural action in connection with real time data packets, since packets that arrive very late are in any case useless for the applications and therefore they can be discarded already in the compressor side. If the difference D is not greater than Dmax, the time-stamp TS is compressed according to the invented method. If the difference is greater than zero, it means that the packet has arrived slightly delayed. Preferably the stored value TS represents the largest value of the time-stamp transmitted so far, and therefore the value of the stored time-stamp is not updated. If the difference D is smaller than zero, the value of the stored time-stamp is updated (step 77). This precedure will be followed for each packet throughout the session.

Figure 8:
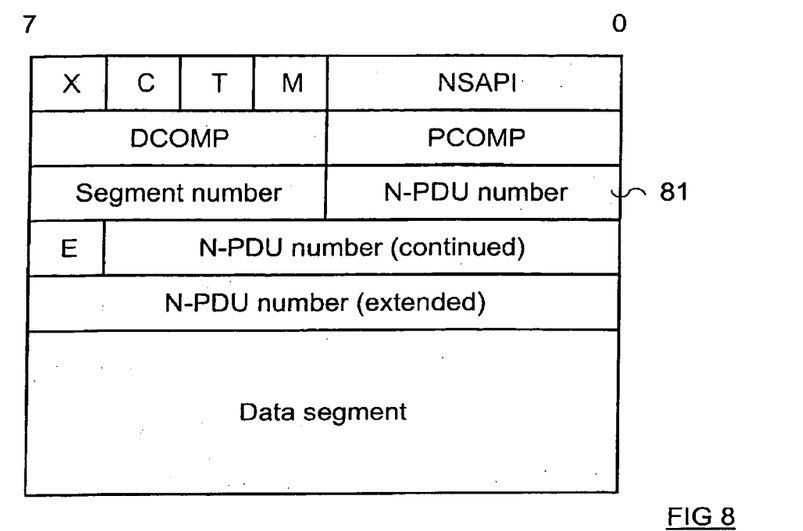
FIG. 8 illustrates the format of a SNDCP SN-UNITDATA PDU.

In some cases the identification data can be compressed to a minimum in the compressed header and still the compression sequence will span the whole session. Such an embodiment comprises a mapping between fields of network layer and access network layer protocols. Network layer in this context refers to packet data network level protocol layers, referring to IP, UDP and RTP protocols in the embodiment shown herein. Access network layer in this context refers to the protocol layer specific to the access network and responsible for compression and decompression functions, in this case the SNDCP. A Packet Data Unit (PDU) of SNDCP contains an integral number of octets, a header part and a data part. Two different SN-PDU formats are defined, SN-DATA PDU for acknowledged data transfer and SN-UNITDATA PDU for unacknowledged data transfer. FIG. 8 illustrates the format of a SNDCP SN-UNITDATA PDU used in unacknowledged transmission of GPRS. SN-UNITDATA PDU comprises a field N-PDU number 81 that is a running number progressing throughout the session.

A mapping between network layer data packets and data packets of the protocol layer responsible for the compression can be generated. In the embodiment herein, a mapping between the SNDCP SN-UNITDATA PDU field N-PDU number and the RTP sequence number, IP identification and the RTP time stamp is shown. When the N-PDU number increases by one, values in the RTP sequence number field 316 and IP identification field 335 generally increase by a value that is constant throughout the session. Furthermore there are codecs for which the difference between subsequent RTP time stamps is constant. Using a hexadecimal representation, for a case where this difference is F0, and the increments for RTP sequence number is one and for IP identification is 0100, a following mapping is effective:

N-PDU number=5

RTP sequence number=16C5

RTP time stamp=02FFBFEF

IP identification=E7E6

N-PDU number=6

RTP sequence number=16C6

RTP time stamp=02FFC0DF

IP identification=E8E6

N-PDU number=7

RTP sequence number=16C7

RTP time stamp=02FFC1DF

IP identification=E9E6

Though constant increments are utilised herein, mapping can be implemented in several other ways, as well. For instance, a mapping function between access network layer protocol and the network layer protocol header fields can be established. Furthermore, depending on the application, mapping between any other fields of the access network layer protocol and the network layer protocol can be utilised as well. The context data in the decompressor comprises the information needed for mapping the access network layer protocol field to the network layer protocol fields. The comparison step of the method presented in FIG. 4 will comprise simple validity check of the contents of the access network layer field. The context data will preferentially remain constant and thus requires no updating (re: step 45).

Figure 9:
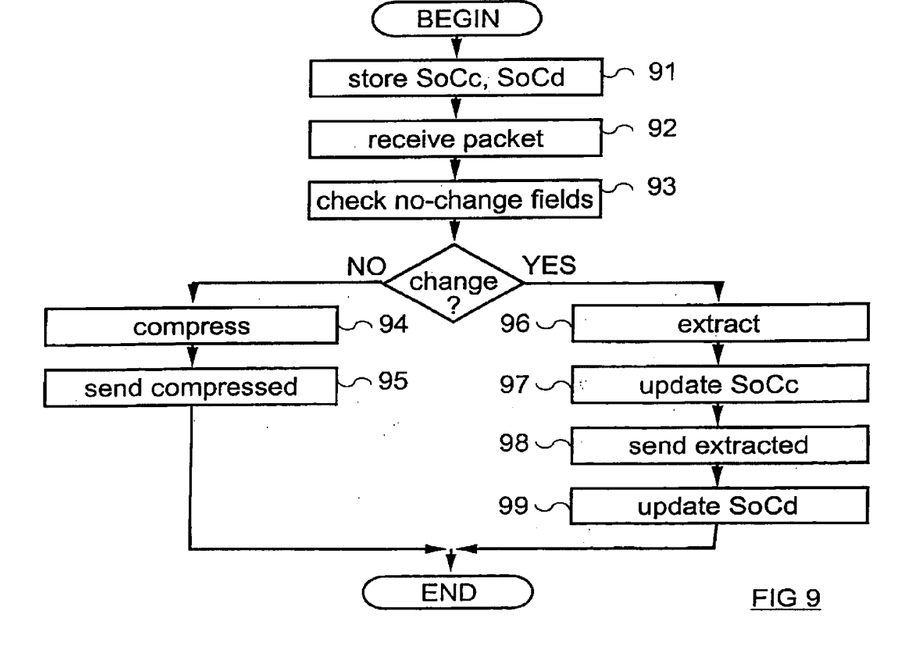
FIG. 9 illustrates an alternative embodiment.

For network layer packets, where a possibility for the no-change fields to change during a session exists, an alternative embodiment shown in FIG. 9 is suggested. The embodiment is again presented using the example where the transmitting entity is the MS and the receiving entity is the SGSN. In connection with the session set-up the state of compression is stored in both the MS (SoC$_c$) and the SGSN (step 91) (SoC$_d$). When a packet is received from the speech codec to be transmitted to the SGSN (step 9), it is checked (step 93) whether there is any change in the no-change fields of the header to be compressed and the fields in the state of compression. If no changes are detected the header is compressed as described earlier (step 94) and the compressed packet is sent to the decompressor (step 95). Anyhow, when changes are detected, a new SNDCP functionality will extract from the new header only the changed no-change fields (step 96), update them to the stored state of compression (step 97), transmit said values to the SGSN (step 98) and update the values to the state of compression stored in the SGSN as well (step 98). Transmission of such information can be done using acknowledged mode or strong error protection.

In a compression/decompression algorithm any combination of these embodiments can be used. Next an example of the use of the invented method is given. Table 1 represents fields in a full header corresponding to network layer protocols IP, UDP, IP. Shaded fields correspond to the fields that remain constant throughout the session and white fields represent fields that may vary during the session.

TABLE 1

Example of IP, UDP and RTP header

| | | | |
|---|---|---|---|
| 45 | 00 | 00 | 40 |
| E7 | E6 | 00 | 00 |
| 80 | 11 | 63 | DC |
| 82 | E9 | F4 | 89 |
| 82 | E9 | F4 | 8D |
| C1 | C0 | C1 | C4 |
| 00 | 2C | AF | 5E |
| 80 | 04 | 16 | C5 |
| 02 | FF | BF | EF |
| A7 | F0 | 03 | 96 |

Assume that this is the first RTP/IP/UDP header received in the SNDCP compressor. The values shown here are in hexadecimal format, and there are 4 octets in a row. First 5 rows (20 octets) represent an IP header. Next two rows are octets of an UDP header and last 3 rows represent the RTP header, altogether forming a typical RTP/UDP/IP header (40 bytes). SNDCP compressor shall copy these values and the full header is sent to the corresponding SNDCP element. Table 2 presents a subsequent header received by the compressor.

TABLE 2

Next IP/UDP/RTP header

| | | | |
|---|---|---|---|
| 45 | 00 | 00 | 40 |
| E8 | E6 | 00 | 00 |
| 80 | 11 | 62 | DC |
| 82 | E9 | F4 | 89 |
| 82 | E9 | F4 | 8D |
| C1 | C0 | C1 | C4 |
| 00 | 2C | D4 | 40 |
| 80 | 04 | 16 | C6 |
| 02 | FF | C0 | DF |
| A7 | F0 | 03 | 96 |

The fields that differ from the stored values are shaded in tables 1 and 2, and comprise 16-bit identification field of IP header:
  From E7E6 to E8E6
16-bit header Checksum of IP header:
  From 63DC to 62DC
16 bit UDP checksum:
  From AF5E to D440
Sequence number of RTP header:
  From 16C5 to 16C6
Timestamp of RTP header:
  From 02FFBFEF to 02FFC0DF
Other fields remain the same. Now, according to the invention, a following compressed header is generated:

TABLE 3

Compressed header

| Bit 7 | Bit 6 | Bit 5 | Bit 4 | Bit 3 | Bit 2 | Bit 1 | Bit 0 |
|---|---|---|---|---|---|---|---|
| T = 0 | M = 0 | 0 | 0 | 0 | 0 | 0 | 0 |
| 1 | 1 | 0 | 0 | 0 | 0 | 0 | 0 |
| 1 | 1 | 0 | 1 | 1 | 1 | 1 | 1 |

The format of the compressed header follows the one presented in connection with FIG. 5 and is presented in binary form. Since the length of the packet has not changed, the 7th bit of the first octet is 0, the marker bit is 0 and in this case the rest of the bits in the first octet are zeros. The next two octets contain the abbreviated timestamp (C0 DF in hexadecimal). An SNDCP packet comprising the compressed header and the RTP payload is sent to the decompressor.

The full time-stamp is reproduced from the abbreviated time-stamp value as described before in connection with FIG. 6. The sequence number of RTP header and 16-bit identification number of IP header shall be derived using the N-PDU number of the SNDCP packet as an offset from the last full header. As the decompressor received the first packet comprising the full header the algorithm made an association between RTP sequence number and N-PDU number of the SNDCP packet. In this case the sequence number would be 16 C5 and the N-PDU number is, say x. When the compressed header is sent the SN-UNITDATA N-PDU number is y, which indicates that the difference between the N-PDUs is y-x and that number shall be added to the stored sequence number.

Figure 10:
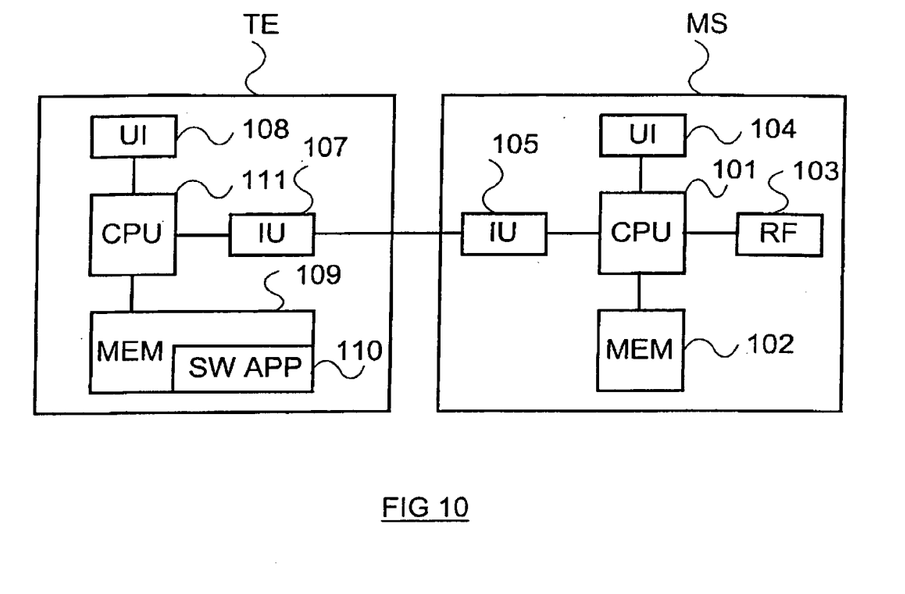
FIG. 10 illustrates blocks responsible for different functions in a mobile station according to the invention.

As an example of a network element implementing the method described herein a mobile terminal of a mobile communication system is presented. The structure of the mobile terminal according to the invention is by far that of a traditional mobile terminal earlier known to a person skilled in the art. Referring to FIG. 10, a Central Processing Unit 101 controls the blocks responsible for the mobile station's different functions: a Memory (MEM) 102, a Radio Frequency block (RF) 103, a User Interface (UI) 104 and an Interface Unit (IU) 105. CPU is typically implemented with one or more functionally inter-working microprocessors. The memory preferably comprises a ROM (Read Only Memory), a RAM (Random Access Memory) and is generally supplemented with memory supplied with the SIM User Identification Module. In accordance with its program, the microprocessor uses the RF block 103 for transmitting and receiving messages on the radio path. Communication with the user is managed with by the UI 104, which typically comprises a loudspeaker, a display and a keyboard. The Interface Unit 105 is the link to a data processing entity, and it is controlled by the CPU 101. The data processing entity 101 may be an integrated data processor or an external data processing equipment.

FIG. 10 also illustrates the functional modules of a data processing entity TE according to the invention. The terminal equipment TE may be for example a Personal Computer prior known from office environment, or a workstation. TE may also be an integral part of the MS (e.g. smartphone) sharing elements such as UI and CPU with the MS. Vice versa, MS may also be integrated in the TE (e.g. card phone). It is appreciated, that even though in FIG. 10 two separate blocks are shown, no restriction to the configuration is implied therewith.

TE substantially comprises an interface unit IU 107 corresponding to the one in MS, to control the interface to the MS. It also comprises a User Interface UI 108 for receiving user commands and outputting information to the user, a memory MEM 109 to store applications SW APP 110 and applications related data, and a processor CPU 111 to control the operations of the TE and to carry out the application procedures.

There exists a plurality of methods to connect the mobile station MS and the data processing entity, all known to a person skilled in the art. One of the methods is to interconnect the devices through interface units IU comprising wired connection, appropriate interconnection interface e.g. a serial port, and supplemented with appropriate interfacing software in the CPUs controlling the operation of the interface units IU. Another method is to use wireless connection in infrared wavelength range or to use low-power radio frequency transceiver units. The new solutions where the MS is integrated in the TE also provide a very feasible platform to the system according to the invention.

When a user wants to access a packet data network with the TE, on the basis of commands from user input devices the processor CPU 111 retrieves from the memory MEM 109, a packet data access application SW APP 110. The application is processed in the CPU 111 in the packet form and whenever a need for sending application related information arises, a packet is forwarded to the MS through the IU 107.

In the first embodiment the compression and decompression functions are implemented in the SNDCP layer of the protocol stack of the mobile terminal. In the embodiment shown herein the elements involved with SNDCP function are the ones that have here been described in the MS part. In uplink direction the MS acts as a compressor and in downlink direction the MS acts as a decompressor.

Values used for the compression and decompression operations are stored in the memory 102 of the MS. Compression is implemented in the central unit 111 and the compressed units are forwarded to the RF unit 102 for transmitting to the SGSN through the BS. Compressed packets from the SGSN are received by the RF unit and forwarded to the CPU 111 for decompression. Decompressed packets are forwarded to the TE through the Interface Units 105 and 107.

Although the invention has been shown and described in terms of a preferred embodiment, those persons of ordinary skill in the art will recognise modifications to the preferred embodiment may be made without departure from the scope of the invention as claimed below. For example, in future GPRS or corresponding services (GPRS derivatives) will be implemented to other mobile telecommunication systems as well. Third generation WCDMA (Wideband Code Division Multiple Access) standard has a structure that is close to GPRS, and comprises a L3CE layer, which corresponds to SNDCP of GPRS. Such layer for incorporating the functionalities of the invented is the SNDCF layer of CDMA2000. It is possible to apply the invention in fixed networks, as well. Thus the possibilities to realize and use the invention are limited only by the enclosed claims.

What is claimed is:

1. A method for transferring a data packet from a compressor (MS) to a decompressor (SGSN), said data packet including a header with header data fields, a number of the header data fields that remain constant during the data transfer being stored in the decompressor, the method comprising:

sending from the compressor and receiving at the decompressor a data packet comprising information on one or more header data fields that vary during the data transfer;

decompressing the header using the stored header data fields and the received information on the one or more header data fields that vary during the data transfer;

comprising sending from the compressor and receiving at the decompressor a compressed value for a header data field, said compressed value identifying the data packet in a compression sequence and the compressed value being formed by taking a first number of least significant bits of the header data field;

maintaining in the decompressor context data comprising information for relating the received compressed value to a corresponding compression sequence, the information being updated according to the received compressed values;

using the compressed value and the information of the corresponding compression sequence for mapping the compressed value into a decompressed header data field.

2. A method according to claim 1, wherein the compression sequence comprises a set of successive data packets that can be differentiated from each other with the resolution provided by the compression value.

3. A method according to claim 1, wherein the header is a RTP/UDP/IP header, the data field is one of the following: IP identification, RTP sequence number, RTP time-stamp, and the compressed value is a first number of least significant bits of the data field.

4. A method according to claim 3, wherein the context data comprises at least a second number of the most significant bits of the data field.

5. A method according to claim 1, wherein the compressor and the decompressor are network elements of an access network to a IP packet data network.

6. A method according to claim 5, wherein the compressor and the decompressor are network elements of a wireless access network to a IP packet data network.

7. A method according to claim 6, wherein the compressor and the decompressor are network elements of a mobile communication network supporting GPRS.

8. A method according to claim 7, wherein the compression and decompression functionalities are implemented in the SNDCP layer of the GPRS.

9. A method for processing a data packet comprising: receiving a data packet comprising an ordinal, said ordinal indicating the order of the packet in a series of transmitted packets;

comparing the ordinal of the received packet with an earlier stored comparison ordinal;

initiating, as a response to the difference between the ordinal of the received packet and the comparison ordinal exceeding a predefined limit, an error function;

initiating, as a response to the difference between the ordinal of the received packet and the comparison ordinal being less than a predefined limit, a header compression algorithm;

storing, as a response to the ordinal of the received packet being greater than the comparison ordinal and the difference between the ordinal of the received packet and the comparison ordinal being less than a predefined limit, the ordinal of the received packet as the comparison ordinal.

10. A method according to claim 9, wherein the error function comprises discarding the new packet.

11. A method according to claim 9, wherein the ordinal is the time-stamp of a data packet.

12. A method according to claim 9, wherein the ordinal is the sequence number of a data packet.

13. An access network element (MS) comprising:

means for transferring a data packet to a decompressor (SGSN) said data packet including a header with header data fields:

means for compressing the header by excluding header data fields that remain constant during the data transfer from transmission;

means for sending to the decompressor a data packet comprising information on one or more header data fields that vary during the data transfer;

comprising:

means for sending a compressed value for a header data field associated with identifying the data packet in a compression sequence, the compressed value being formed by taking a first number of least significant bits of the header data field.

14. An access data network element according to the claim 13, comprising:

means for receiving a data packet comprising an ordinal, said ordinal indicating the order of the packet in a series of transmitted packets;

means for comparing the ordinal of the received packet with an earlier stored ordinal;

means for initiating, as a response to the difference between the ordinal of the received packet and the comparison ordinal exceeding a predefined limit, an error function;

means for initiating, as a response to the difference between the ordinal of the received packet and the comparison ordinal being less than a predefined limit, a header compression algorithm;

means for storing, as a response to the ordinal of the received packet being greater than the comparison ordinal, the ordinal of the received packet as the comparison ordinal.

15. An access network element (MS) comprising means for receiving data packets said data packets including a header with header data fields;

means for storing header data fields that remain constant during the data transfer;

means for receiving compressed data packets comprising information on one or more header data fields that vary during the data transfer;

means for decompressing compressed data packets using the stored header data fields and the received information on the one or more header data fields that vary during the data transfer;

comprising:

means for receiving in a data packet a compressed value identifying the data packet in a compression sequence, the compressed value being a first number of least significant bits of the header data field;

means for maintaining context data comprising information for relating the received compressed value to a corresponding compression sequence, said information being updated according to the received compressed values;

means for using the compressed value and the information of the corresponding compression sequence for mapping the compressed value into a header data field in a decompressed data packet.

16. An access data network element according to claim 13, wherein the element is a mobile terminal of a mobile communication network.

17. An access data network element according to claim 13, wherein the element is a SGSN of a mobile communication network supporting GPRS.

* * * * *